(12) United States Patent
Pfaffinger et al.

(10) Patent No.: US 12,547,159 B2
(45) Date of Patent: Feb. 10, 2026

(54) COMPUTER-IMPLEMENTED METHOD FOR DETERMINING AN OPTIMUM ASSIGNMENT OF MODULE TYPES TO AN ASSEMBLY LINE SELECTED WITH REGARD TO ITS ASSEMBLY CAPACITY

(71) Applicant: Siemens Aktiengesellschaft, Munich (DE)

(72) Inventors: Alexander Pfaffinger, Munich (DE); Christian Royer, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 452 days.

(21) Appl. No.: 18/103,895

(22) Filed: Jan. 31, 2023

(65) Prior Publication Data

US 2023/0251636 A1  Aug. 10, 2023

(30) Foreign Application Priority Data

Feb. 9, 2022 (EP) .................................... 22155900

(51) Int. Cl.
G05B 19/418 (2006.01)

(52) U.S. Cl.
CPC ... G05B 19/41865 (2013.01); G05B 19/4188 (2013.01)

(58) Field of Classification Search
CPC .......... G05B 19/41865; G05B 19/4188; H05K 13/085; G06Q 10/04; G06Q 50/04
See application file for complete search history.

(56) References Cited

U.S. PATENT DOCUMENTS

| | | | |
|---|---|---|---|
| 10,117,370 B2* | 10/2018 | Pfaffinger | .......... H05K 13/0857 |
| 10,842,024 B2 | 11/2020 | Pfaffinger et al. | |
| 10,921,791 B2* | 2/2021 | Ikeda | ................ G05B 19/41805 |
| 11,523,553 B2* | 12/2022 | Pfaffinger | .............. G06Q 50/04 |
| 2015/0296671 A1 | 10/2015 | Pfaffinger et al. | |

(Continued)

FOREIGN PATENT DOCUMENTS

| | | |
|---|---|---|
| EP | 3219180 B1 | 9/2017 |
| EP | 2893791 B1 | 9/2018 |

(Continued)

*Primary Examiner* — Mong-Shune Chung
(74) *Attorney, Agent, or Firm* — Schmeiser, Olsen & Watts LLP

(57) ABSTRACT

A method for determining an optimum assignment of module types including:
 a) ascertaining an expected production time for each module type of the modules to be assembled and for each assembly line;
 b) assigning a set of module types of the set of module types to a predefined number of fixed-setup setup families containing respectively associated fixed setups;
 c) optimizing the assignment from b) such that, for all module types that are assigned to the fixed-setup setup families, a sum of differences between the expected production time per module type, if it were to be assembled on one of the remaining assembly lines with the minimum production time out of the at least one remaining assembly line, and the expected production time on the selected assembly line is maximized; and
 d) outputting the optimized assignment in a form suitable for controlling and/or regulating the assembly of the modules.

11 Claims, 2 Drawing Sheets

(56) References Cited

U.S. PATENT DOCUMENTS

Figure 1:
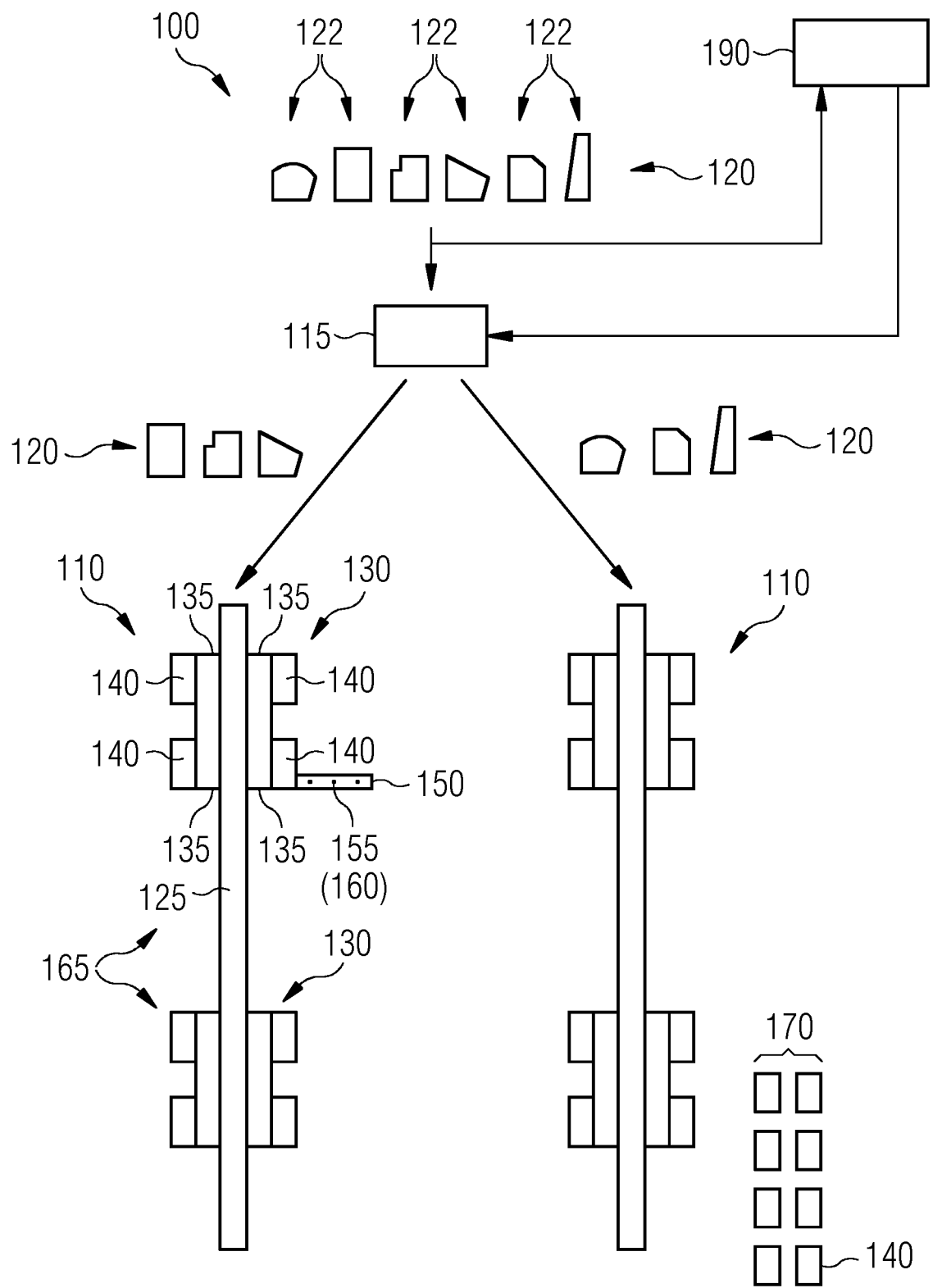

2019/0082567 A1* 3/2019 Pfaffinger .............. G06Q 10/04
2020/0120839 A1* 4/2020 Pfaffinger ............ H05K 13/085

FOREIGN PATENT DOCUMENTS

| JP | 5963873 B2 | 8/2016 | |
|---|---|---|---|
| WO | 2014041686 A1 | 3/2014 | |
| WO | WO-2014079601 A1 * | 5/2014 | ........... H05K 13/085 |
| WO | 2019011412 A1 | 1/2019 | |

* cited by examiner

COMPUTER-IMPLEMENTED METHOD FOR DETERMINING AN OPTIMUM ASSIGNMENT OF MODULE TYPES TO AN ASSEMBLY LINE SELECTED WITH REGARD TO ITS ASSEMBLY CAPACITY

CROSS-REFERENCE TO RELATED APPLICATIONS

This application claims priority to EP Application No.22155900.8, having a filing date of Feb. 9, 2022, the entire contents of which are hereby incorporated by reference.

FIELD OF TECHNOLOGY

The following relates to a computer-implemented method for determining an optimum assignment of module types to an assembly line selected with regard to its assembly capacity, and to an arrangement comprising a control system and a control device, and to an associated computer program product.

BACKGROUND

In particular in the field of electronics production, circuit boards or modules to be manufactured are produced on SMT assembly lines using surface-mount technology (SMT). Electronics production or manufacture is characterized by high requirements in terms of short lead times, high productivity (including short changeover times, short production times, etc.) and high flexibility.

A plurality of assembly machines, which are usually connected by a transport system, and which interact in order for example to manufacture or assemble (electronics) modules, constitute an assembly line.

In industrial manufacturing plants in the field of electronics production, modules (or circuit boards) to be manufactured are produced in commissions with fixedly predefined batch sizes.

The batch sizes implicitly define how often a module has to be produced. The smaller the batch size of a module, the more often this module has to be produced and the greater the setup expense.

Creating a (component) setup for an assembly line requires around 6-8 hours and thus causes enormous expense. The modules are thus produced in setup families. A setup family is in this case a set of module types that are able to be produced with one setup on the assembly line.

In other words, a setup family, also called a cluster, comprises a set of batches that is able to be manufactured within one setup. All modules of the module types of a setup family are thus able to be manufactured in succession without having to change over the assembly line.

A setup may be kept on one or more setup tables that are able to be interchanged easily on the assembly machines. Refilling a setup table with components of predetermined component types is however complicated. The setups are therefore often differentiated into fixed setups and variant setups, with a fixed setup on a setup table being intended to retain its composition of component types over a predetermined planning horizon, while a variant setup table is expected to be changed over within the planning horizon.

EP 2 893 791 B1 discloses a method for determining the most advantageous possible fixed setup for an assembly line. However, this method does not take into account the fact that multiple assembly lines of an assembly system should ideally be matched to one another in terms of their assigned circuit board types, in order to configure parallel production of circuit boards of different circuit board types as efficiently as possible.

EP 3 219 180 B1 solves the problem from EP 2 893 791 B1 for multiple assembly lines of an assembly system.

Now, in industrial manufacturing plants, there are often one or more selected assembly lines, also called priority lines, that have a high assembly capacity. The priority lines are operated mainly with fixed setups or at least a high fixed setup proportion. On the remaining "normal" assembly lines with comparatively lower assembly capacities, these generally being variant lines, module (types) are manufactured predominantly with setups that are created temporarily (cluster setups).

There are various machine cycle times in the manufacture of modules on the various assembly line types—in the abovementioned context, on the priority line and one or more of the remaining assembly lines. There are also what are known as external cycle times that are caused by processing by way of a printer or by the dwell time in an oven. This external cycle time is typically around 16 s. Machine cycle times below this external cycle time lead to unproductive waiting times for the external cycle timer.

SUMMARY

An aspect relates to specify a method and an associated device/system or arrangement in which an optimum assignment of module types to the selected assembly line and the one or more normal assembly lines is determined in order to achieve a highest possible gain in terms of the overall production time when assembling/manufacturing the module types following assignment thereof to the abovementioned assembly line types.

Embodiments of the invention discloses a computer-implemented method for determining an optimum assignment of module types to an assembly line selected with regard to its assembly capacity from a predefined set of assembly lines for assembling modules of these module types with components of one or more component types and to at least one remaining assembly line of said set of assembly lines, comprising the following steps:

a) ascertaining an expected production time for each module type of the modules to be assembled and for each assembly line, taking into consideration an acquired respective cycle time of the module type on the assembly lines and taking into consideration a parts number of modules to be assembled that is predefined per module type;

b) assigning a set of module types of said set of module types to a predefined number of fixed-setup setup families containing respectively associated fixed setups, such that a module of a module type of a fixed-setup setup family is able to be assembled on the selected assembly line by way of components of component types of the fixed setup;

c) optimizing the assignment from b) such that, for all module types that are assigned to the fixed-setup setup families, the sum of the differences between the expected production time per module type, if it were to be assembled on one of the at least one remaining assembly lines with the minimum production time out of the at least one remaining assembly line, and the expected production time on the selected assembly line is maximized; and d) outputting the optimized assignment in a form suitable for controlling and/or regulating the assembly of the modules.

It is accordingly possible to assign at least one further set of module types of said set of module types to the at least one remaining assembly line.

According to embodiments of the invention, module types should be assigned for a selected assembly line so as to optimize production time and at the same time fixed-setup setup families for these assembly lines should be formed.

A fixed setup—as already mentioned in the introduction—is formed by providing supplies of components of the component types that they comprise on one or more setup tables.

The module types for the one or more selected assembly lines should in this case be selected as far as possible such that these one or more assembly lines is or able to be operated with few fixed setups in order to avoid unproductive changeovers on these expensive high-capacity assembly lines (priority lines).

An assembly commission comprises a parts number or set of modules of one module type.

Embodiments of the invention additionally bring the advantage that the batch sizes are able to be reduced in comparison with the cited prior art. This then introduces more flexibility into the production of the modules and the products into which the finished modules are to be inserted.

The above method may be iterated as often as desired. At least one fixed-setup setup family of module types may be determined by way of steps a) to d) centrally on a control system of the type described below.

According to one development of embodiments of the invention, the abovementioned optimization in step c) takes place such that, for the set of module types that are not assigned to a fixed-setup setup family, the number of component types required for assembly on one of the remaining assembly lines is minimized.

The number of component types on the remaining assembly lines, which are variant lines, should thus be as small as possible in order to minimize setup expense on these assembly lines as far as possible.

This is because, the more different component types are required on an assembly line, the more variant setups are required. This then causes increased refilling/emptying/changeover expense.

It is accordingly expedient for weighting to be performed or to be able to be performed between above step c) and said development of embodiments of the invention.

The module types that are assigned to a fixed-setup setup family should have the same module width.

One development of embodiments of the invention makes provision, for the module types to be assembled on the selected assembly line, for the sum of the expected production times per module type not to be allowed to exceed a maximum temporal degree of use of the selected assembly line.

One development of embodiments of the invention makes provision, for the module types to be assembled on the selected assembly line, for the sum of the expected production times per module type not to be allowed to drop below a minimum temporal degree of use of the selected assembly line.

One development of embodiments of the invention makes provision to use mixed-integer linear programming as optimization method for the assignment of the module types.

The form suitable for controlling or for regulating the performance of the assembly commission and the accompanying form suitable for controlling the assembly of the modules is computer-readable. Controlling or regulating the assembly of the modules that are assigned to corresponding module types ultimately makes it possible to assemble the modules.

Based on the determined optimum assignment of module types in said form, the assembly of components is able to be controlled and/or regulated and/or carried out. In this case, the fixed setup results from a corresponding fixed-setup setup family of the determined fixed-setup setup families to which the module types of the modules to be assembled are assigned.

In the above computer-implemented method, "acquired" or "able to be acquired" or "predefined" or "able to be predefined" may be understood to mean that one or more input values are already defined, for example by standard (values), or are predefined or defined and/or able to be predefined or able to be defined by a user and/or by output values of an upstream computer-implemented method. These input values are thus acquired from the computer-implemented method.

In one particularly preferred embodiment, the optimization takes place by way of mixed-integer programming. Mixed-integer programming constitutes a global optimization approach that is able to be expanded easily and for which commercial solution methods and solution devices, also called solvers, are obtainable. Mixed-integer programming may be used to find global maxima in a large number of possible solutions, such that a particularly good solution is able to be found. Obtainable methods or devices for mixed-integer programming are continuously being improved, and so it may be expected that even better optimization results will be able to be achieved in the future.

It is possible to predetermine a metric that expresses a ratio of a difference between the index and a maximum achievable assignment quality. This difference is also called a "gap". It is desirable to use an optimization method in which this "gap" is able to be determined. This may be achieved in particular with mixed-integer programming.

The optimized assignment according to embodiments of the invention of module types to a selected assembly line and fixed-setup setup families results in an increase in productivity in a manufacturing plant, by
    considerably reducing setup expense
    reducing the requirement for setup equipment (over the longer term),
    increasing productivity through shorter lead times, shorter changeover times and production times.
    Flexibility, throughput and delivery reliability are increased
    Smaller batch sizes are possible.

A further aspect of embodiments of the invention provides a control system comprising at least one computing unit that is configured to carry out a computer-implemented method for determining an optimum assignment of module types to an assembly line selected with regard to its assembly capacity from a predefined set of assembly lines for assembling modules of these module types with components and to at least one remaining assembly line of said set of assembly lines, comprising:
    a) a calculation unit for ascertaining an expected production time for each module type of the modules to be assembled and for each assembly line, taking into consideration an acquired respective cycle time of the module type on the assembly lines and taking into consideration a parts number of modules to be assembled that is predefined per module type;

b) an assignment unit for assigning a set of module types of said set of module types to a predefined number of fixed-setup setup families containing respectively associated fixed setups, such that a module of a module type of a fixed-setup setup family is able to be assembled on the selected assembly line by way of components of component types of the fixed setup;

c) an optimization unit for optimizing the assignment from b) such that, for all module types that are assigned to the fixed-setup setup families, the sum of the differences between the expected production time per module type, if it were to be assembled on one of the at least one remaining assembly lines with the minimum production time out of the at least one remaining assembly line, and the expected production time on the selected assembly line is maximized; and d) an output unit for outputting the optimized assignment in a form suitable for controlling and/or regulating the assembly of the modules.

A further aspect provides a control device, comprising at least a reception unit for receiving an optimized assignment of a set of module types of a predefined set of module types to a predefined number of fixed-setup setup families each containing associated fixed setups in a form suitable for controlling and/or for regulating the assembly of the modules, and a computing unit for distributing module types to an assembly line selected with regard to its assembly capacity from the set of assembly lines and to at least one remaining assembly line of said set of assembly lines using the optimized assignment, by way of which the sum of the differences between the expected production time per module type, if it were to be assembled on one of the at least one remaining assembly lines with the minimum production time out of the at least one remaining assembly line, and the expected production time on the selected assembly line is maximized.

Also disclosed is an arrangement comprising a control system and one or more control devices of the abovementioned type, in which (arrangement) the modules are able to be assembled using the assignment of module types as determined by the control system to the one or more selected assembly lines and to at least one fixed-setup setup family and using the one or more control devices on one of the at least one selected assembly lines and the one or more remaining assembly lines on said assembly lines. There may be one control device centrally for multiple assembly lines. This or these one or more control devices is or are in this case connected to the control system, which may be arranged remotely from the control device and possibly outside the manufacturing plant in a data center or in a cloud (computer cloud). It is also possible for one control device each to be provided for multiple assembly lines or for one control device to be provided per assembly line. In the case of a decentralized solution, the multiple control devices accordingly communicate with one another via a wired and/or wireless communication network to which the control system is then connected.

The arrangement and the system and the device and possibly associated unit(s) are configured to execute such method steps, and may be implemented in the form of hardware, firmware and/or software.

A further aspect of embodiments of the invention is a computer program (product) (non-transitory computer readable storage medium having instructions, which when executed by a processor, perform actions) comprising program code able to be executed by a computing unit or processor or multiple interacting program code modules able to be executed by multiple computing units and which contain instructions that prompt the execution of the method according to one of the abovementioned embodiments on the control system in the abovementioned manner and/or in the arrangement in the abovementioned manner.

The computer program or computer program product may be stored on a computer-readable storage medium or data carrier. It is possible for the computer program (product) to be incorporated into a data carrier signal that is intended for the downloading of said computer program product from a server to a storage medium. The computer program or computer program product may be created in a conventional programming language (for example C++, Java). A processing apparatus or processor for executing the program code/program code modules thereof may comprise an off-the-shelf computer or server having corresponding input, output and storage means. This processing apparatus or computing unit may be integrated in the control system or device or in the units thereof or be implemented in the arrangement or the arrangement components.

The computer-implemented method also concerns what are known as cloud services (cloud=computer cloud). A computer cloud generally comprises one or more servers that are operated by a cloud service provider and are configured to deliver a cloud service to one or more service users, for example a company network. The data processing system may accordingly be implemented in a computer cloud.

The arrangement, the control system and the control devices and the computer program (product) and data carrier or data carrier signal may be designed and developed analogously to the abovementioned method and the developments thereof.

BRIEF DESCRIPTION

Figure 2:
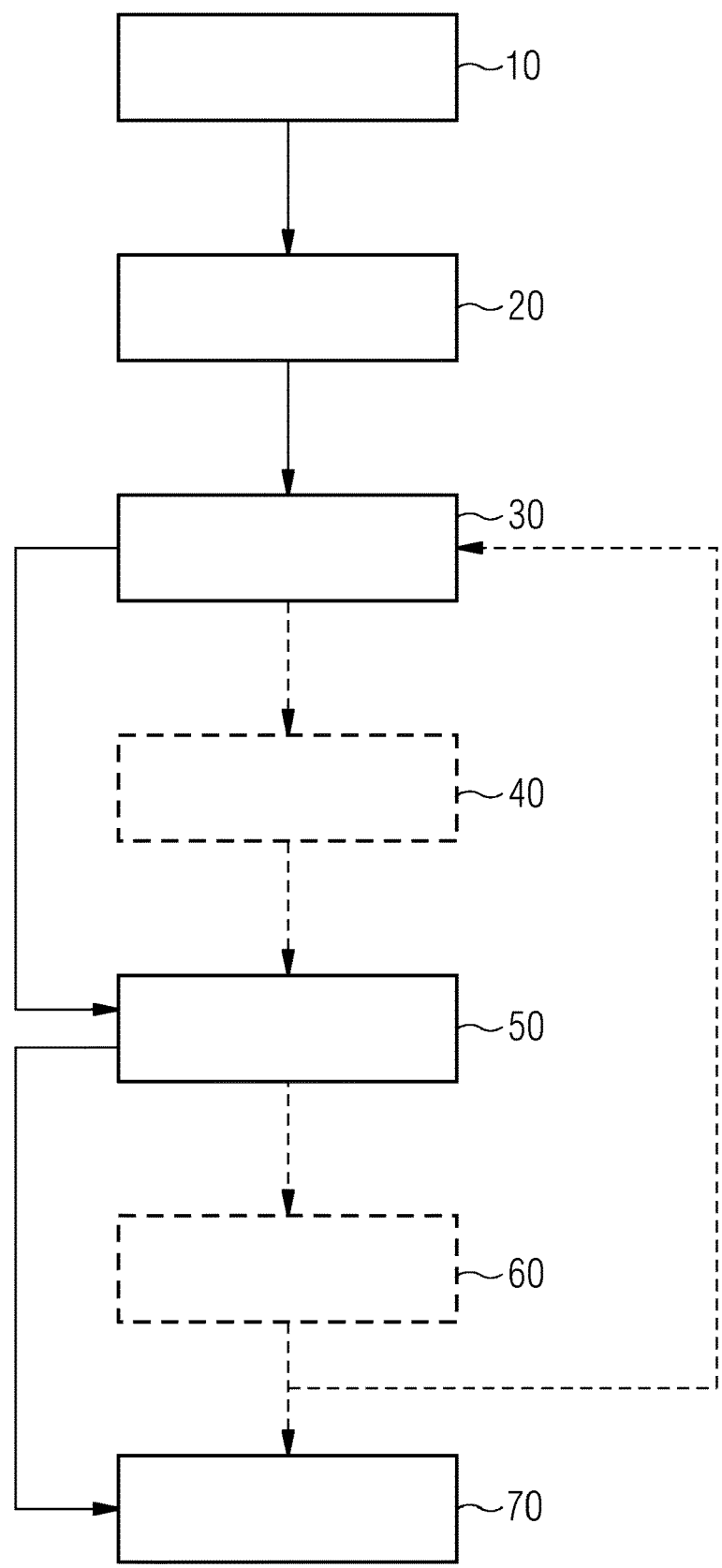

Some of the embodiments will be described in detail, with reference to the following figures, wherein like designations denote like members, wherein:

FIG. 1 shows an assembly system by way of example; and
FIG. 2 shows a flowchart of the method according to the invention.

DETAILED DESCRIPTION

FIG. 1 shows an assembly system 100 comprising one or more assembly lines. The assembly system 100 comprises one or more assembly lines 110 and a control device 115. Here in the example, the assembly line illustrated on the left may be an assembly line of the type mentioned at the outset, also called priority line, selected with regard to assembly capacity. The assembly line illustrated on the right corresponds in the example to a remaining "normal" assembly line.

Each assembly line 110 comprises an optional transport system 125 and one or more assembly machines 130. Each assembly machine 130 comprises one or more assembly heads 135 that are each configured to pick up components or component parts 155 from a setup table 140 and to position them at a predetermined position on the module or circuit board 120 that is located on the transport system 125.

During the assembly process, the circuit board 120 is usually stationary with respect to the assembly machines 130. The setup tables 140 each comprise a multiplicity of feed apparatuses 150, of which only one is shown in FIG. 1 by way of example. Each feed apparatus 150 keeps ready a supply of components 155 of a predetermined component type 160. The feed apparatus 150 has a loading capacity for the components 155, this usually being expressed in lines. A line is usually 8 mm wide and the number of lines of each feed apparatus 150 is limited, for example to 40. Components 155 of the same component type 160 are usually provided on a belt, on a tablet or in a tube. Each component type 160 requires space in the feed apparatus 150 with a predetermined number of lines, which usually have to adjoin one another.

Each feed apparatus 150 may be configured to keep ready different components 155, and different feed apparatuses 150 are usually be able to be attached to a setup table 140. If a component 155 of a component type 160 is required at the assembly machine 130 and is not present on one of the setup tables 140, then the attached setup table 140 is usually not provided with the required components 155, but rather swapped completely for another appropriately equipped setup table 140. Refilling a setup table 140 to be swapped in with components 155 is called pre-setup and may require a processing time in the region of hours.

Since a change of setup tables 140 on the assembly line 110 is usually accompanied by a production downtime, it is attempted to change the setup tables 140 as rarely as possible.

An assembly commission comprises the parts number of the circuit boards of a circuit board type to be assembled. To assemble a set of circuit boards 120 able to be predetermined based on the assembly commissions, it is possible to form setups that each comprise supplies of components 155 of predetermined component types 160, wherein each circuit board of the set of circuit boards 120 is able to be assembled completely with components 155 of the setup. A setup may be formed by a number of setup tables 140. The illustration of FIG. 1 shows a fixed setup 165, the setup tables 140 of which are attached to the assembly line 110, and a variant setup 170, the setup tables 140 of which are separate from the assembly line 110. Provision may be made for one or more fixed setups 165 and one or more variant setups 170. A desirable case without variant setups 170 is possible.

The fixed setup 165 is configured to remain unchanged or intact with regard to its component types 160 at least over a planning horizon, which may be for example half a year or a year. Although, when necessary, components 155 may thus be refilled on the setup tables 140 of the fixed setup 165, the assignment of component types 160 to tracks of the setup tables 140 remains unchanged. If multiple fixed setups 165 are provided, then these may be exchanged for one another within the planning horizon.

A variant setup 170 on the other hand is configured to receive components 155 of different component types 160 over the planning horizon, but remains intact only temporarily. To this end, the setup tables 170, while they are not attached to the assembly line 110, are usually emptied of components 155 of predetermined component types 160 and filled with components 155 of other component types 160. This changeover may comprise a considerable amount of manual work and be time-consuming.

A setup family, whether a fixed-setup setup family or a variant-setup setup family, is defined as a set of circuit board types the circuit boards of which are able to be assembled on an assembly line without changing the set of component types that are kept ready for the assembly on the assembly line. In other words, it does not have to be changed over.

The control device 115 assigns circuit board types 122, the assigned circuit boards 120 of which are intended to be assembled on the assembly line 110, to a setup family. A setup family is a set of circuit board types 122, the circuit boards 120 of which are able to be assembled completely with components 155 that are provided in the assigned setup 165, 170. A setup family is usually assigned to precisely one setup 165, 170 and vice versa.

FIG. 1, in addition to the assembly system 100, additionally shows an arrangement that also comprises a control system 190.

One or more control devices for example 115, which is/are configured, for one or more assembly lines 110, to control/regulate the module assembly process on the assembly lines so as to perform the assembly commissions, may in each case be connected to a (central) control system 190 in a cloud or computer cloud using wired and/or wireless network technologies.

Said control system is designed to execute the computer-implemented method according to embodiments of the invention, explained in more detail below, for determining an optimum assignment of module types. The control system may be coupled to a data memory or data storage medium, not illustrated, and may possibly retrieve stored or preconfigured models of the assembly systems. One or more optimization units, not illustrated, may be integrated into the control system or coupled thereto, in which what are known as solvers, for example Cplex, Gurobi, may be used. Solvers are special mathematical computer programs that are able to numerically solve mathematical problems. In the optimization unit, an assignment of circuit board types of acquired assembly commissions is optimized in each case with respect to the assembly lines and to one or more fixed-setup setup families. The fixed-setup setup families thereby determined are used to define the fixed setups that are intended to be used on the assembly lines.

An optimization of the abovementioned variant-setup setup families or associated variant setup may also be achieved in the optimization unit.

An output unit, not illustrated, of the control system delivers the determined optimum assignment of module types in a form suitable for controlling and/or for regulating the performance of the assembly commission. Such a form should be computer-readable, for example one or more Excel lists in CSV format, which contains the individual module type assignments to the assembly lines and fixed-setup setup families possibly to the variant setup families, wherein it is possible to derive which assembly line type is suitable for which module type from the information from the data memory.

It may finally be assessed through simulation, what effects the optimized assignment have on the operation of the individual assembly lines. An objective function of said optimization should reach its maximum or a predefinable index.

The determination of the optimum assignment of circuit board types may then optionally be repeated.

These one or more Excel lists may then each be transmitted to one or more control devices 115 arranged in an assembly system for reception thereof at a reception unit, not illustrated. A computing unit, not illustrated, of the control device may then control and/or regulate assembly of circuit boards in accordance with the determined optimum assignment.

In addition and as an alternative, it is possible for the control device to receive other computer-readable control signals in order to prompt the control/regulation process in its computing unit therefrom.

The modules or circuit boards are usually assembled such that the components 155 are fixed individually to the circuit boards 120 by way of solder paste. The assembled circuit boards 155 may then be finished in a reflow oven in which the solder paste is temporarily melted, such that the components 155 are connected electrically and mechanically to conductor tracks on the surface of the circuit board 120.

FIG. 2 shows a flowchart of the method according to embodiments of the invention, comprising the following steps:

In step 10, the set of assembly lines is predefined. The number of fixed-setup setup families is predefined for each assembly line. Each fixed setup includes a fixed-setup setup family. A set of selected assembly lines with a high assembly capacity is then predefined from the set of assembly lines.

In the next step 20, an expected production time may be acquired in each case for each module type of the modules to be assembled. In this case, an acquired or acquirable respective cycle time of the module type on the assembly lines is taken into consideration for each assembly line. A parts number, predefined for each module type, of modules to be assembled is additionally taken into consideration.

In step 30, a kind of starting solution is determined for an assignment of a set of module types of said set of module types to a predefined number of fixed-setup setup families containing respectively associated fixed setups. It should be taken into consideration here that a module of a module type of a fixed-setup setup family is able to be assembled on the selected assembly line using components of component types of the fixed setup.

Optional step 40: During the assignment in step 30, various auxiliary conditions may additionally be taken into consideration, these being described in more detail for example in the following formulation of a mixed-integer program. This step 40 may also be bypassed, and step 50 then directly follows step 30.

Step 50: Based on the index that is calculated below, the above assignment may be optimized so as to achieve an optimum, preferably a maximum, for this index. In addition to other embodiments of the index that are mentioned in the general part of the present application, the index in the exemplary embodiment is calculated as follows: for all module types that are assigned to the fixed-setup setup families, as index, the sum of the differences between the expected production time per module type, if it were to be assembled on one of the at least one remaining assembly lines with the minimum production time out of the at least one remaining assembly line, and the expected production time on the selected assembly line is maximized. Optional step 60: The optimization in step 50 may optionally take place such that, for the set of module types that are not assigned to a fixed-setup setup family, the number of component types required for assembly on one of the remaining assembly lines is minimized.

The method is optionally repeated with continuation of step 30 in order optionally to further optimize the determined optimum assignment with regard to the index.

Finally, in step 70, the result of the determined optimum assignment of the module types is output in a (computer-readable) form suitable for controlling and/or for regulating the performance of the assembly commission.

An automatic optimization may be used to determine an optimum assignment of module types. In this case, it is possible to use any optimization methods, for example based on local search methods or metaheuristic algorithms. In each run-through of said steps, the best assignment determined up to present is varied pseudo-randomly or heuristically, so as to give modified assignments, of which the one with the optimum assignment quality is selected.

One special case of optimization methods is linear optimization. This deals with optimizing linear objective functions over a set that is restricted by linear equations and inequalities. It forms the basis of the solution method of (mixed-)integer linear optimization. In connection with MIP (mixed integer programming) or MILP (mixed-integer linear programming), it is possible to use standard solvers such as for example CPLEX, Scip, Gurobi, Xpress for small IP problems (integer optimization models).

More difficult than linear optimization is the case of non-linear integer optimization (MINLP), in which the objective function, the auxiliary conditions (NB) or both may be present. The solution is achieved by using appropriate linear approximations so as to be able to use standard solvers directly. Furthermore, the abovementioned standard solvers are each already able to solve specific types of non-linear problems. There are also additional solvers that specialize in solving non-linear problems (for example ANTIGONE, BARON).

Non-linear integer optimization methods may be used to ascertain fixed-setup setup families, using which an index that is optimum in relation to all module types or a maximum index is achieved.

Steps 30-60 are performed by solving a mixed-integer program. Optimizers based on mixed-integer programs are—as explained above—obtainable as commercial products.

Advantages of mixed-integer linear optimization (MILP=Mixed-Integer Linear Programming) are:
Global optimization approach.
Easily expandable.
Very good commercial standard solvers (for example Gurobi, SCIP, CPLEX, Ilog, Xpress), which are widely available and proven in practice.
For an ascertained solution, it is known how far away it is at most from the optimum solution (Gap).

One example of a MILP formulation for determining the described assignment of module types is given below.

The fixed-setup setup families for the selected assembly lines (priority line) are formed such that the production time gain is maximized in relation to manufacture of the modules on the variant line and possibly at the same time the number of component types (also called component variance) on the variant line is minimized.

The following restrictions are to be complied with here:
Complying with a minimum production time, since it is necessary to guarantee that the priority line is not underloaded.
Complying with a maximum production time, since it is necessary to guarantee that the priority line is not overloaded.
A fixed-setup setup family must not contain any potentially different circuit board widths.
The component setup of a fixed-setup setup family must be able to be refilled on the assembly line.

The following designations apply in the MILP formulation.

Indices

C Set of component types
R Set of module types $R_c$ Set of module types with component type c
Cl Set of fixed setups/fixed setup families for the priority line Parameters $W_P$ Objective function weighting with regard to production time
$W_S$ Objective function weighting with regard to setup expense on the variant line
$Width_c$ Space taken up by a component type c in lines
LineCap Number of lines of the component types that have space in the setup of a setup family of the priority line
Upper TimeLimit Upper production time limit for all module types assigned to the priority line
LowerTimeLimit Lower production time limit for all module types assigned to the priority line
$CycleTR_r$ Cycle time of a module of type r on the priority line
$CycleTV_r$ Cycle time of a module of type r on the variant line
$Quantity_r$ Parts number of the modules of type r to be manufactured
ExtCycleTR External cycle time of the priority line
ExtCycleTV External cycle time of the variant line
$BoardWidth_r$ Module width of a module of type r Binary Variables $assign_{r,cl}$ Variable that indicates whether the modules of type r are assigned to the setup family cl. (In this case, it takes the value 1, otherwise the value 0)
$setup_{c,cl}$ Variable that indicates whether the component type c needs to be set up in the setup of the fixed-setup setup family cl. (In this case, it takes the value 1, otherwise the value 0)
$setupV_c$ Variable that indicates whether the component type c needs to be set up on the variant line in variant setups. (In this case, it takes the value 1, otherwise the value 0)

Objective Function $$\text{Maximiere } W_P \sum_{cl \in Cl} \sum_{r \in R} assign_{r,cl}(\max\{CycleTV_r, ExtCycleTV\} - \max\{CycleTR_r, ExtCycleTR\}) \, Quantity_r + W_S \sum_{c \in C} -setupV_c$$

Auxiliary Conditions (1) Each module type may be assigned to at most one setup family.

$$\sum_{cl \in Cl} assign_{r,cl} \leq 1 \quad r \in R$$

(2) The component types of the module types of a fixed-setup setup family must fit into a fixed setup for the priority line.

$$\sum_{c \in C} Width_c \, setupR_{c,cl} \leq LineCap \quad cl \in Cl$$

(3) All component types of module types of a fixed-setup setup family must be set up in the setup of the fixed-setup setup family.

$$\sum_{r \in R_c} assign_{r,cl} \leq |R_c| setupR_{c,cl} \quad c \in C, cl \in Cl$$

(4) If not all module types that require a specific component type c are assigned to the fixed setups of the priority line, the non-assigned modules must also be set up on the variant line.

$$|R_c| - \sum_{r \in R_c} assign_{r,cl} \leq |R_c| setupV_c \quad c \in C$$

(5) The sum of the production times of the module types of a fixed-setup setup family must not exceed the upper production time limit.

$$\sum_{cl \in Cl} \sum_{r \in R} assign_{r,cl} \max\{CycleTR_r, ExtCycleTR\} \, Quantity_r \leq UpperTimeLimit$$

(6) The sum of the production times of the module types of a fixed-setup setup family must not drop below the lower production time limit.

$$\sum_{cl \in Cl} \sum_{r \in R} assign_{r,cl} \max\{CycleTR_r, ExtCycleTR\} \, Quantity_r \geq LowerTimeLimit$$

(7) All module types assigned to a fixed-setup setup family must have the same module width.

| | |
|---|---|
| $assign_{r,cl} + assign_{r',cl} \leq 1$ | $cl \in Cl, r, r' \in R, BoardWidth_r \neq BoardWidth_{r'}$ |

(8) Variable restrictions

| | |
|---|---|
| $assign_{r,cl} \in \{0,1\}$ | $r \in R, cl \in Cl$ |
| $setupR_{c,cl} \in \{0,1\}$ | $c \in C, cl \in Cl$ |
| $setupV_c \in \{0,1\}$ | $c \in C$ |

The method may also be applied to the case with multiple variant lines and priority lines, each of one type.

The MILP formulation given by way of example above and the resulting production time gain achieved allowed the inventors to contribute to achieving a saving of 2 out of 15 assembly lines in a manufacturing plant.

Although embodiments of the invention have been illustrated and described in more detail on the basis of the preferred exemplary embodiment, embodiments of the invention are not restricted by the examples disclosed, and other variations may be derived herefrom by a person skilled in the art without departing from the scope of protection of embodiments of the invention.

The processes or method sequences/steps described above may be implemented on the basis of commands or instructions available on computer-readable, non-volatile storage media or in volatile computer memories (referred to collectively as computer-readable memories below). Computer-readable memories are, for example, volatile memories such as caches, buffers or RAM and non-volatile memories such as removable data storage media, hard disks, etc.

The functions or steps described above may be present in this case in the form of at least one instruction set in/on a computer-readable memory. In this case, the functions or steps are not tied to a particular instruction set or to a particular form of instruction sets or to a particular storage medium or to a particular processor or to particular execution schemes and may be executed alone or in any desired combination by means of software, firmware, microcode, hardware, processors, integrated circuits, etc. In this case, a wide variety of processing strategies may be used, for example serial processing by an individual processor or multiprocessing or multitasking or parallel processing, etc.

The instructions may be stored in local memories, but it is also possible to store the instructions in a remote system, for example a cloud, and to access them via a network.

"Computer-aided" or "computer-implemented" in connection with embodiments of the invention may be understood to mean for example an implementation of the method in which in particular a processor or a computing unit, which may be part of the control system or of the (control or processing) device or unit and/or of a computer and/or of one or more services in a computer cloud (cloud) of a service provider, executes at least one method step of the method.

Unless stated otherwise in the above description, the terms "map", "emulate", "receive", "apply", "output", "provide" and the like relate to operations and/or processes and/or processing steps that change and/or generate data and/or convert data into other data, wherein the data may be represented or be present in particular in the form of physical variables.

The term "processor", "central signal processing", "control unit" or "data evaluation means" as used here comprises processing means in the broadest sense, that is to say for example servers, general-purpose processors, graphics processors, digital signal processors, application-specific integrated circuits (ASICs), programmable logic circuits such as FPGAs, discrete analog or digital circuits and any combination thereof, including any other processing means known to a person skilled in the art or developed in the future. In this case, processors may consist of one or more systems or devices or apparatuses or units. If a processor consists of a plurality of devices, they may be designed or configured for the parallel or sequential processing or execution of instructions. A "storage unit" in connection with embodiments of the invention may be understood to mean for example a computer-readable memory medium in the form of main memory (random access memory, RAM) or a hard disk.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for determining an optimum assignment of module types to an assembly line selected with regard to an assembly capacity from a predefined set of assembly lines for assembling modules of the module types with components of one or more component types and to at least one remaining assembly line of the set of assembly lines, the method comprising:

a) ascertaining an expected production time for each module type of the modules to be assembled and for each assembly line, taking into consideration an acquired respective cycle time of the module type on the assembly lines and taking into consideration a parts number of modules to be assembled that is predefined per module type;

b) assigning a set of module types of the set of module types to a predefined number of fixed-setup setup families containing respectively associated fixed setups, such that a module of a module type of a fixed-setup setup family is able to be assembled on the selected assembly line by way of components of component types of the fixed setup;

c) optimizing the assignment from b) such that, for all module types that are assigned to the fixed-setup setup families, a sum of differences between the expected production time per module type, if it were to be assembled on one of the at least one remaining assembly lines with the minimum production time out of the at least one remaining assembly line, and the expected production time on the selected assembly line is maximized; and d) outputting the optimized assignment in a form suitable for controlling and/or regulating the assembly of the modules.

2. The method as claimed in claim 1, wherein the optimization in c) takes place such that, for the set of module types that are not assigned to a fixed-setup setup family, the number of component types required for assembly on one of the remaining assembly lines is minimized.

3. The method as claimed in claim 1, wherein the module types that are assigned to a fixed-setup setup family have the same module width.

4. The method as claimed in claim 1, wherein, for the module types to be assembled on the selected assembly line, a sum of the expected production times per module type is not allowed to exceed a maximum temporal degree of use of the selected assembly line.

5. The method as claimed in claim 1, wherein, for the module types to be assembled on the selected assembly line, a sum of the expected production times per module type is not allowed to drop below a minimum temporal degree of use of the selected assembly line.

6. The method as claimed in claim 1, wherein mixed-integer linear programming is applied as optimization method for the assignment.

7. A computer program product, comprising a computer readable hardware storage device having computer readable program code stored therein, said program code executable by a processor of a computer system to implement a method as claimed in claim 1 on a control system or in an arrangement.

8. A non-transitory computer-readable storage medium comprising the computer program product as claimed in claim 7.

9. A control system comprising at least one computing unit that is configured to carry out a computer-implemented method for determining an optimum assignment of module types to an assembly line selected with regard to an assembly capacity from a predefined set of assembly lines for assembling modules of the module types with components and to at least one remaining assembly line of the set of assembly lines, the control system comprising:

one or more processors configured to:
a) ascertain an expected production time for each module type of the modules to be assembled and for each assembly line, taking into consideration an acquired respective cycle time of the module type on the assembly lines and taking into consideration a parts number of modules to be assembled that is predefined per module type;

b) assign a set of module types of the set of module types to a predefined number of fixed-setup setup families containing respectively associated fixed setups, such that a module of a module type of a fixed-setup setup family is able to be assembled on the selected assembly line by way of components of component types of the fixed setup;

c) optimize the assignment from b) such that, for all module types that are assigned to the fixed-setup setup families, a sum of differences between the expected production time per module type, if it were to be assembled on one of the at least one remaining assembly lines with the minimum production time out of the at least one remaining assembly line, and the expected production time on the selected assembly line is maximized; and d) output the optimized assignment in a form suitable for controlling and/or regulating the assembly of the modules.

10. An arrangement comprising the control system as claimed in claim 9 and a control device.

11. A control device, comprising:

one or more processors configured to:

receive an optimized assignment of a set of module types of a predefined set of module types to a predefined number of fixed-setup setup families each containing associated fixed setups in a form suitable for controlling and/or for regulating the assembly of the modules, and distribute module types to an assembly line selected with regard to an assembly capacity from the set of assembly lines and to at least one remaining assembly line of the set of assembly lines using the optimized assignment, by way of which a sum of differences between the expected production time per module type, if it were to be assembled on one of the at least one remaining assembly lines with the minimum production time out of the at least one remaining assembly line, and the expected production time on the selected assembly line is maximized.

* * * * *